Dec. 30, 1958   J. C. RHODES ET AL   2,866,339
THERMALLY COMPENSATING VAPOR PRESSURE MEASUREMENT SYSTEM
Filed Sept. 30, 1954   2 Sheets-Sheet 1

Joseph C. Rhodes
Robert B. Jacobs
John P. Segers
BY   INVENTORS.

Everett A. Johnson
ATTORNEY

Dec. 30, 1958   J. C. RHODES ET AL   2,866,339
THERMALLY COMPENSATING VAPOR PRESSURE MEASUREMENT SYSTEM
Filed Sept. 30, 1954   2 Sheets-Sheet 2

Joseph C. Rhodes
Robert B. Jacobs
John P. Segers
    INVENTORS.
BY
Everett A. Johnson
    ATTORNEY United States Patent Office 2,866,339
Patented Dec. 30, 1958

2,866,339

THERMALLY COMPENSATING VAPOR PRESSURE MEASUREMENT SYSTEM

Joseph C. Rhodes, Park Forest, Robert B. Jacobs, Homewood, and John P. Segers, Crete, Ill., assignors to Standard Oil Company, Chicago, Ill., a corporation of Indiana Application September 30, 1954, Serial No. 459,421

5 Claims. (Cl. 73—407)

This invention relates to apparatus for measuring absolute pressures accurately in pressure ranges remote from zero. More particularly, this invention relates to a vapor pressure device for use in automatically measuring the vapor pressure of blended gasolines.

In many operations, it is desirable to measure absolute pressures accurately in a suppressed pressure span which is remote from zero. One example of such an operation is the determination of Reid vapor pressure in an apparatus employing a constant temperature bath, a float chamber in the constant temperature bath, a controlled vent from the float chamber, and means for measuring the pressure in the float chamber as an indication of the Reid vapor pressure of the sample. A free surface of liquid is maintained within the chamber and the pressure therewithin is proportional to the vapor pressure of the liquid at the temperature of the constant temperature bath. If a conventional absolute gauge (vacuum on the reference side) is used in such a system, a high range instrument is employed and such an instrument is inherently of low sensitivity. Furthermore, it has been found that in such a system the Reid vapor pressure readings are sensitive to variations in bath temperatures and sensitive to the differences in height between the recorder and the bath.

It is, therefore, a primary object of this invention to provide an apparatus which permits measurements to be made within any range with full scale sensitivity available for the range selected. A more specific object of our invention is to provide a Reid vapor pressure recorder for use in continuously measuring absolute vapor pressures of gasolines. An additional object is to provide an apparatus whereby the Reid vapor pressure readings are substantially insensitive to variations in bath temperatures and to differences in height between the recorder and the bath. Other objects and advantages of the invention will become apparent as the description of our invention proceeds.

Briefly, according to our invention, we provide an apparatus for measuring absolute pressures in ranges remote from zero which employs a differential pressure-sensing element, and a bulb filled with an inert and stable liquid which is maintained at a constant temperature, the bulb providing a reference pressure for the system at the level remote from zero at which the absolute pressure is to be measured.

A preferred embodiment of our invention will now be described with reference to the accompanying drawings which form a part of this specification and wherein.

Figure 1:
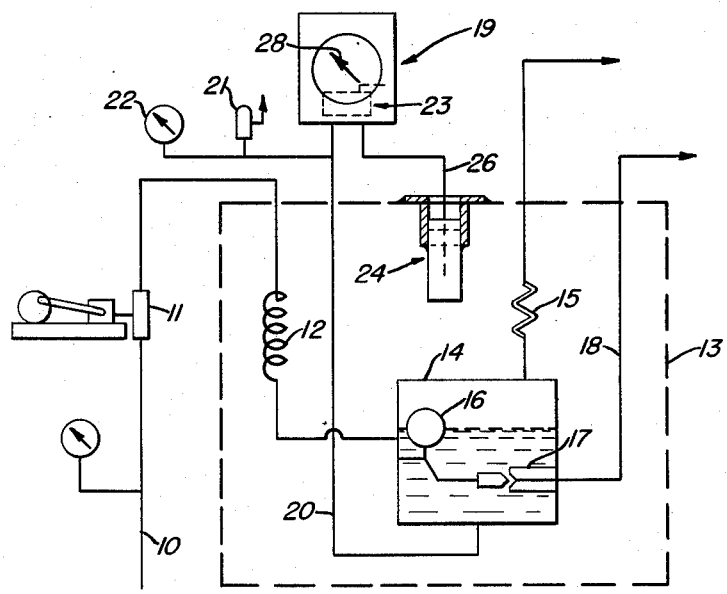
Figure 1 is a diagrammatic view of a typical installation employing our invention.

Referring to Figure 1 of the drawings, a gasoline sample is metered from line 10 by pump 11 at a constant rate of flow and is preheated in coil 12 within the constant temperature bath 13 which is maintained at a temperature of about 140° F. From the preheater coil 12 the gasoline passes to the vapor chamber 14 which is also within the temperature bath 13. A free surface of gasoline is maintained within chamber 14 and the pressure within the chamber 14 is the vapor pressure of the gasoline at the chamber temperature except for the reduction of pressure due to the continuous capillary vent 15. A float 16 and needle valve 17 control the free surface at a constant level and the excess liquid flows by line 18 to a sump (not shown) maintained at atmospheric pressure.

A measure of the volatility of the gasoline under test is obtained by measuring the absolute pressure in the chamber 14. This is done by connecting an absolute pressure recording instrument 19 to the chamber 14 through impulse line 20 which communicates with the liquid phase within the chamber 14. A pressure relief valve 21 and a pressure gauge 22 can be provided on line 20 between the recorder 19 and the chamber 14 as is customary in conventional practice.

Figure 2:
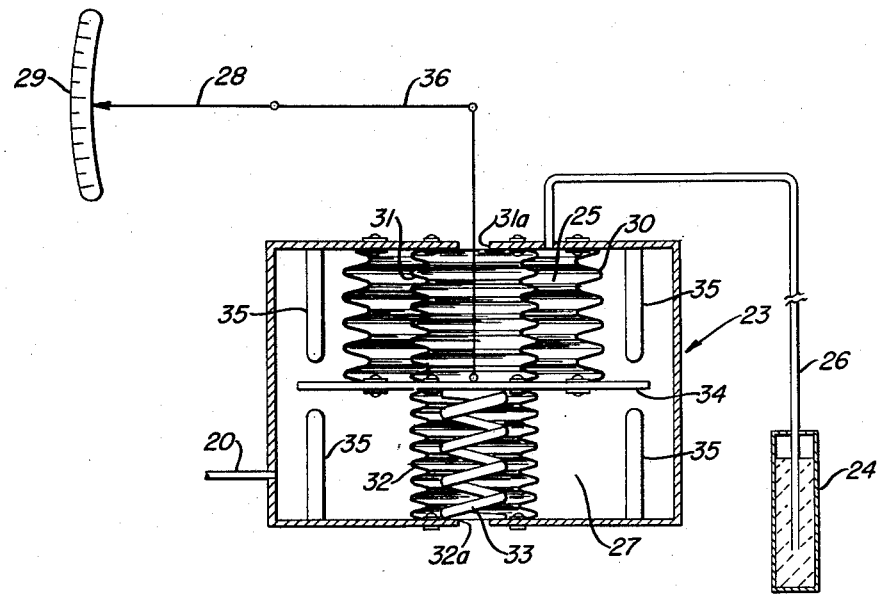
Figure 2 is a detailed section illustrating the compensating means in a differential pressure recorder.

Within recorder 19, we provide a differential pressure-sensing element 23 shown in some detail by Figure 2. A compensating bulb 24 is connected to the reference side 25 of the differential pressure-sensing element 23 by line 26 and the bulb 24 is immersed in the constant temperature bath 13. An absolute pressure on the reference side 25 of element 23 is determined by the choice of the liquid in the bulb 24 and the temperature of the bath 13. Any convenient reference pressure can be obtained by a suitable choice of the liquid and of the constant temperature applied to the bulb 24.

It has been found that for the determination of Reid vapor pressure on an apparatus of the type described herein, a bath temperature of about 140° F. gives the best correlation between Reid vapor pressure and absolute vapor pressure. Further, we have found that at a bath temperature of about 140° F. gasolines meeting our commercial specifications of about 9 to about 13 pounds Reid vapor pressure have an absolute pressure of from about 20 to about 32 p. s. i. a. Accordingly, the liquid used in the reference cell 24 (in addition to being stable and chemically pure) should meet two other specifications. One is that the vapor pressure of the liquid be below about 20 pounds at 140° F. The other is that the slope of the vapor pressure-temperature curve correspond approximately to the curve for the gasolines meeting our preferred specifications.

We have found that acetone, having a vapor pressure of about 17 pounds absolute at 140° F., is particularly suitable as our reference liquid. The slope of the vapor pressure-temperature curve of acetone is essentially the same as the corresponding curve for a gasoline having an 11 pound Reid vapor pressure, such a gasoline being about the median of commercial gasoline specifications referred to above.

The operating side 27 of the differential pressure element 23 is connected to the system by impulse line 20. Differences in pressures between the reference and operating sides of element 23 are indicated by the pointer 28 through the linkage 36 which is pivotally attached to the plate 34. The pointer 28 moves on a graduated scale 29 calibrated for the particular bellows 30, 31 and 32 and the spring 33.

Referring to Figure 2, the element 23 comprises a casing with the bellows 30 concentric with the bellows 31 above the plate 34, the bellows 31 and 30 co-operating to produce the annular reference side 25 therebetween. Below the plate 34 is bellows 32 and spring 33. The interior of bellows 32 and 31 are exposed to the atmosphere by ports 31a and 32a in the casing of the element 23. The chamber exterior of bellows 30 provides, with the casing of element 23, the operating side 27. Four limit stops 35 prevent permanent distortion of the bellows in the event of excess pressures being applied to either side of the sensing element 23.

Figure 4:
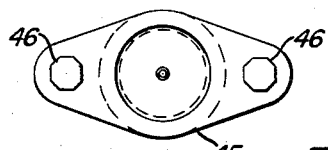
Figure 4 is a top view of the bulb in Figure 3.
Figure 3:
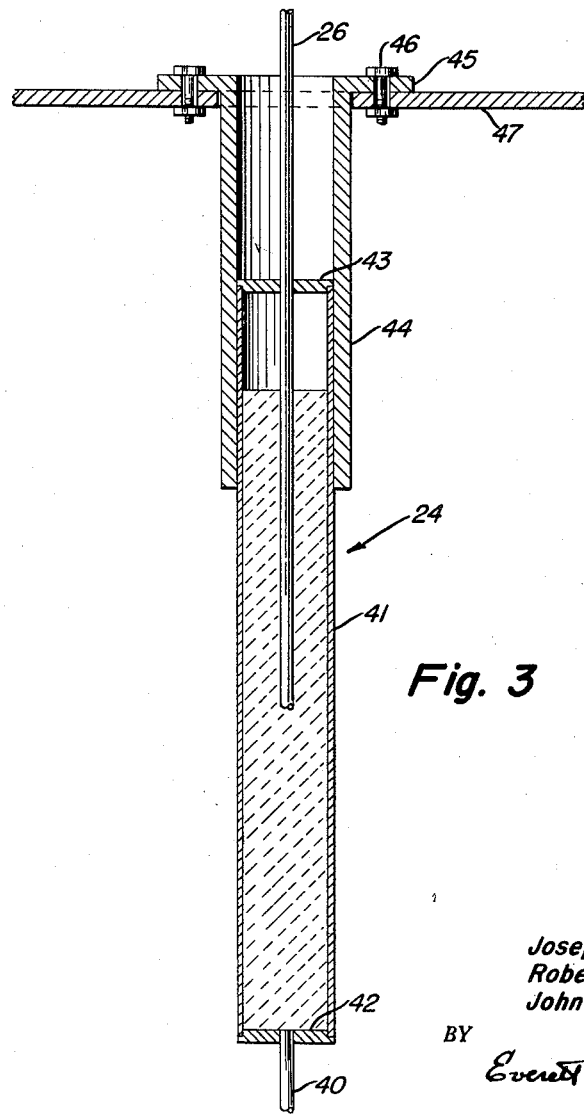
Figure 3 is a detailed section of the temperature-compensating bulb shown in the apparatus illustrated by Figures 1 and 2.

Referring to the bulb 24, and to Figures 3 and 4 in particular, it may comprise, for example, a brass tubing 41 about 0.75 inch O. D. and 6 inches long, and closed at both ends by discs 42 and 43. A capillary tube 40, about 2 feet long, passes through the lower disc 42 for evacuating and filling the bulb 24. A ⅛ inch O. D. copper tubing 26, about 6 feet long, passes through the upper disc 43 to about a mid-point of the tubing 41 and is connected to the reference side 25 of the element 23.

The bulb 24 is completely evacuated by line 40 and then partially filled with a chemically-pure and stable liquid capable of providing the desired reference pressure under the selected operating temperature conditions. The volume of the entire reference system, including the annular bellows reference side 25, the tubing 26 and the bulb 24, is approximately 87 cc. In making the preferred installation, this system is filled with acetone as the reference liquid at 32° F. and 15 cc. withdrawn, after which the capillary 40 is sealed.

The bulb 24 is mounted below the level of liquid in the constant temperature bath 13 within a sleeve hanger 44 having an upper eliptical flange 45 provided with drilled and tapped holes 46 for securing the hanger 44 to the cover plate 47 of the constant temperature bath 13. The bulb 24 may be permanently fixed to the hanger 44 as by silver soldering thereby permitting the withdrawal of the hanger 44 and bulb 24 without disturbing the bath or cover plate 47.

In an installation of the type illustrated by Figure 1 for determining Reid vapor pressure of blended gasolines, we employ acetone in the bulb 24 and maintain the bath 13 at a temperature of about 140° F. At this temperature, acetone has an absolute pressure of about 17 p. s. i. a. The change in the vapor pressure of acetone and that of the blended gasoline with change in temperature is about the same and we have found that with variations in bath temperature of as much as 3° F. there is a variation in the Reid vapor pressure indications of only about 0.1 p. s. i. Without our reference system, a change of 3° F. in the bath temperature would give a variation of from 0.5 to 0.7 p. s. i. in the Reid vapor pressure indications. Thus, it is apparent that the sensitivity and accuracy of the vapor pressure instrument is greatly enhanced by employing the reference pressure system according to our invention.

Although we have described our invention with reference to a preferred embodiment thereof and for a specific use of such embodiment, it should be understood that these are by way of illustration only. In any event, modifications in the apparatus and in the techniques for using the apparatus will become apparent to those skilled in the art from our description and such can be made without departing from the spirit and scope of the invention.

What we claim is:

1. An apparatus for compensating for the effect of thermal fluctuations upon the measured vapor pressure of a liquid substance which comprises in combination a vapor pressure measuring chamber, said chamber containing a continuously renewed constant volume of liquid substance, a capillary vent from said chamber, a reference cell exterior of said pressure measuring chamber, a reference liquid in said cell having a vapor pressure-temperature curve corresponding approximately to the vapor pressure-temperature curve of the liquid substance, a differential pressure sensing and recording means, separate impulse line means extending from a low point in said chamber and from a low point in said cell to opposite sides of said differential pressure sensing means, a constant temperature bath means in which said chamber and cell are immersed, and sleeve means supported by said bath means supporting said reference cell within said bath.

2. A thermally compensated vapor pressure measurement system which includes a differential pressure recorder means, vapor pressure measuring chamber means, said chamber means being adapted to confine a continually changing, constant volume of test fluid, a pressure connection between said chamber means and one side of said recorder means, and a constant temperature bath means in which said chamber means is immersed, said differential pressure recorder means being adapted to measure the absolute pressure in a range remote from zero in said vapor pressure measuring chamber means, a thin-walled elongated reference chamber, said reference chamber containing a fluid having a vapor pressure such that the vapor pressure-temperature curve corresponds approximately to the vapor pressure-temperature curve of said test fluid, an evacuating and filling line communicating with the lower end of said reference chamber, a flanged sleeve means surrounding only an upper portion of said reference chamber and supporting said reference chamber vertically end-wise within said constant temperature bath means, and a conduit means extending within said reference chamber approximately to the mid-point of the length of said reference chamber and extending axially thereof and of said sleeve into communication with the other side of such differential pressure recorder means.

3. In a Reid vapor pressure recorder for gasolines the improvement which comprises a device for measuring the absolute pressure in a range remote from zero, said device comprising a differential pressure-sensing means having operating and reference sides, a recording means for said differential pressure-sensing means, a vented vapor chamber, means for maintaining a continually changing, constant volume of liquid gasoline in said chamber, a constant temperature bath containing said chamber, a capillary vent from said chamber, a reference cell exterior of said chamber, said reference cell and said vent being immersed within said constant temperature bath, a reference fluid in said cell having a vapor pressure such that the vapor pressure-temperature curve corresponds approximately to that of gasolines at the temperature of the bath, and impulse line means connecting said vapor chamber and said reference cell to the operating and reference sides, respectively, of said differential pressure-sensing means.

4. In a Reid vapor pressure recorder for gasolines the improvement which comprises a device for measuring the absolute pressure in a range remote from zero, said device comprising a differential pressure-sensing means having operating and reference sides, a recording means for said differential pressure-sensing means, a vented vapor chamber, means for maintaining a continually changing, constant volume of liquid gasoline in said chamber, a constant temperature bath containing said chamber, a capillary vent from said chamber, a reference cell exterior of said chamber, said reference cell and said vent being immersed within said constant temperaure bath, a reference fluid in said cell comprised of acetone, and impulse line means connecting said vapor chamber and said reference cell to the operating and reference sides, respectively, of said differential pressure-sensing means.

5. In a Reid vapor pressure recorder for gasolines the improvement which comprises a device for measuring the absolute pressure in a range remote from zero, said device comprising a differential pressure-sensing means having operating and reference sides, a recording means for said differential pressure-sensing means, a vented vapor chamber, means for maintaining a continually changing, constant volume of liquid gasoline in said chamber, a constant temperature bath containing said chamber, a capillary vent from said chamber, a reference cell exterior of said chamber, said reference cell and said vent being immersed within said constant temperature bath, a reference fluid in said cell comprised of a gasoline, and impulse line means connecting said vapor chamber and said reference cell to the operating and reference sides, respectively, of said differential pressure-sensing means.

References Cited in the file of this patent

UNITED STATES PATENTS

| | | |
|---|---|---|
| 999,574 | Von Linde | Aug. 1, 1911 |
| 2,116,802 | Shivers | May 10, 1938 |
| 2,147,021 | Ford | Feb. 14, 1939 |
| 2,200,261 | Carney | May 14, 1940 |
| 2,281,978 | Kibre | May 5, 1942 |
| 2,341,765 | Erbguth | Feb. 15, 1944 |
| 2,475,894 | Hermanny | July 12, 1949 |
| 2,722,121 | Fisher | Nov. 1, 1955 |
| 2,811,851 | Jacobs | Nov. 5, 1957 |

FOREIGN PATENTS

| | | |
|---|---|---|
| 587,479 | Great Britain | Apr. 28, 1947 |